United States Patent [19]
Herédy et al.

[11] 3,898,096
[45] Aug. 5, 1975

[54] LITHIUM-MOLTEN SALT CELL WITH TRANSITION METAL CHALCOGENIDE POSITIVE ELECTRODE

[75] Inventors: Laszlo Herédy, Canoga Park; Lowell R. McCoy, Woodland Hills, both of Calif.

[73] Assignee: Rockwell International Corporation, El Segundo, Calif.

[22] Filed: June 11, 1973

[21] Appl. No.: 369,033

[52] U.S. Cl.............................. 136/6 F; 136/6 LF
[51] Int. Cl. ........................................ H01m 35/02
[58] Field of Search ...... 136/6 LF, 6 LN, 6 F, 83 T, 136/86 A

[56] References Cited
UNITED STATES PATENTS

| | | | |
|---|---|---|---|
| 3,043,896 | 7/1962 | Herbert et al. | 136/6 LN |
| 3,248,265 | 4/1966 | Herbert | 136/6 LN |
| 3,531,324 | 9/1970 | Fischer et al. | 136/6 F |
| 3,567,516 | 3/1971 | Rightmire et al. | 136/83 |
| 3,751,298 | 8/1973 | Senderoff | 136/6 LF |

Primary Examiner—John H. Mack
Assistant Examiner—H. A. Feeley
Attorney, Agent, or Firm—L. L. Humphries; Henry Kolin

[57] ABSTRACT

A high-temperature lithium-molten salt power-producing secondary cell having improved cycle life on repeated charge and discharge cycles utilizes a selected transition metal chalcogenide as the electrochemically active material of the positive electrode. Preferred positive electrode materials include copper sulfide, iron sulfide, nickel sulfide, and nickel oxide.

9 Claims, 1 Drawing Figure

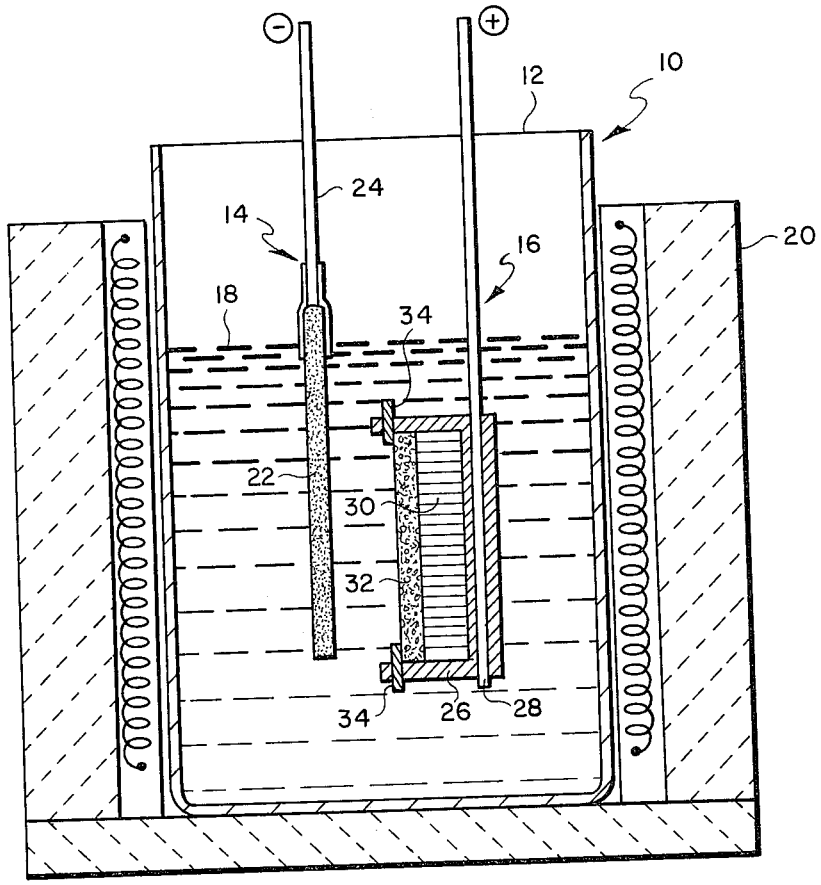

LITHIUM-MOLTEN SALT CELL WITH TRANSITION METAL CHALCOGENIDE POSITIVE ELECTRODE

BACKGROUND OF THE INVENTION

This invention relates to an improved high-temperature electrically regenerable electrochemical system. It more particularly relates to a lithium- or lithium alloy-molten salt secondary cell or battery providing long cycle life at high energy densities and having high coulombic efficiency under conditions of rapid and repeated cycling.

The use of lightweight and highly electropositive lithium metal electrodes is desirable for high energy density, high power density battery systems. However, since lithium is highly reactive in aqueous solutions, lithium-anode cells have been prepared utilizing as nonaqueous electrolytes various organic solvents having dissolved therein conductive salts, in conjunction with various cathode materials (depolarizers). In U.S. Pat. Nos. 3,043,896 and 3,248,265, a lithium negative electrode is used with an electrolyte solution of isopropyl amine saturated with lithium perchlorate, silver sulfide being used as the positive electrode. In U.S. Pat. No. 3,279,952 the cell electrolyte consists of acetic anhydride containing soluble salts such as lithium perchlorate. In U.S. Pat. No. 3,380,855 the electrolyte is methyl formate containing lithium perchlorate as conductive material. In U.S. Pat. No. 3,511,716 the cell has a negative electrode of lithium, a positive electrode of copper sulfide, and a nonaqueous electrolyte comprising a solution of lithium perchlorate in tetrahydrofuran and additionally containing another solvent capable of increasing the solubility of lithium perchlorate. Similarly in U.S. Pat. No. 3,701,688, the negative electrode is lithium, a solution of lithium perchlorate in tetrahydrofuran is the electrolyte, and the positive electrode is preferably copper sulfide. In U.S. Pat. No. 3,711,334, the negative electrode is lithium, the positive electrode is a metal molybdate such as one of silver, copper, iron, cobalt, or nickel, and the electrolyte is tetrahydrofuran in which various soluble salts of the light metals are dissolved. In French Pat. No. 2,102,463 the electrochemical cell consists of a lithium anode, nonaqueous organic electrolyte, and a compressed powdered mixture of copper sulfide, a plasticized synthetic material, and a porous agent. In French Pat. No. 2,102,561 the cell consists of a lithium anode, a copper sulfide cathode, and a solvent of tetrahydrofuran and dimethoxyethane as nonaqueous battery electrolyte. Studies on a lithium-nickel sulfide battery system have also been reported in which the positive electrode consisted of $Ni_3S_2$ blended with an aluminum conductive binder. The electrolyte consisted of a solution of $LiClO_4$ is an aprotic organic solvent such as propylene carbonate or gamma-butyrolacetone.

Lithium-anode cells in which the nonaqueous electrolyte is an organic solvent present many problems which have only been partially solved. Basically these relate to the low current densities and poor coulombic efficiencies obtained with such cells. Problems of compatibility of the solvent and of the included ionic salts with the electrode materials are also encountered.

Because of the foregoing problems encountered with organic electrolytes, other cells using a lithium anode have also been studied. Thus solid-state electrolytes have been used. In U.S. Pat. Nos. 3,404,035 and 3,476,602, a molten alkali metal is used as the anodic reactant. The cathodic reactant is a metal salt, preferably a sulfide of the metal employed as the anodic reactant. A cation-conductive solid barrier is interposed between the anode and cathode. In U.S. Pat. No. 3,506,492, the cell shown has a lithium or a lithium alloy anode, an insulating metal oxide cathode, and a lithium sulfate electrolyte, preferably in the solid state. Such cells present severe technological difficulties in providing adequate seals for the solid electrolyte. These seals are needed to avoid mixing of the molten anode and cathode materials. The solid electrolytes also tend to be fragile and crack with thermal cycling.

Other lithium-anode cells using a molten or fused salt electrolyte have also been extensively studied. Such high-temperature cells have utilized either molten lithium or a solid alloy of lithium such as lithium-aluminum alloy as the negative electrode, with sulfur, selenium, tellurium, or chlorine as the positive electrode, and a molten salt electrolyte such as the eutectic LiCl-KCl binary composition (m.p. 352°C) or a ternary eutectic mixture consisting of LiI-LiCl-KI (m.p. 264°C) or LiI-LiCl-LiF (m.p. 341°C).

The lithium-sulfur cell using a molten halide electrolyte is of particular interest. See M. L. Kyle et al. "Lithium/Sulfur Batteries for Electric Vehicle Propulsion," 1971 Sixth Intersociety Energy Conversion Engineering Conference Proceedings, p. 38; L. A. Heredy et al, Proc. Intern. Electric Vehicle Symp, Electric Vehicle Council 1, 375 (1969). Such lithium-molten salt batteries using sulfur positive electrodes when fully developed could provide an energy density of greater than 100 watt-hr/lb. Were a cycle life of 2500 cycles and an operating life of 10 years attainable with these batteries, they could satisfy all the requirements of electric power peaking, which is of great interest to the electric utility industry for providing off-peak energy storage and load leveling. It has been found, however, that long cycle life is difficult to attain with such high-temperature molten salt batteries containing a sulfur electrode because of the gradual loss of the active sulfur material from the positive electrode compartment at these elevated temperatures. Sulfur loss generally occurs by vaporization of the sulfur or by dissolution of intermediate discharge products (polysulfide ions) in the molten salt electrolyte followed by diffusion from the positive electrode compartment through the bulk of the electrolyte to the negative lithium electrode.

To eliminate some of these problems, it has been proposed to add various substances to the lithium molten salt battery to improve the cycle life of the sulfur electrode. While the addition of these materials has generally resulted in somewhat reducing the activity and hence the volatility of the sulfur, the use of these additives has still not assured the achievement of satisfactory life of the sulfur electrode. In U.S. Pat. No. 3,531,324 a cell is shown containing a molten lithium metal anode, a molten fused salt electrolyte, and a cathode consisting of a molten mixture of phosphorus and sulfur having a composition between that or $P_4S_3$ and $P_4S_{10}$. Such a cell presents various problems in construction and operation and also shows a relatively low percentage of usable theoretical cell capacity, particularly with increasing cell discharge rate. In U.S. Pat. No. 3,470,027, a primary thermal cell is shown in which the fusible electrolyte is a mixture of the fluorides of lithium, sodium, and potassium. The eutectic mixture melts at 454°C. A lithium-magnesium-aluminum alloy anode may be used together with a $V_2O_5$ cathode. In U.S. Pat. No. 3,367,800, a lithium-anode cell is shown in which a molten salt electrolyte, e.g., KSCN-LiBr, is immobilized by being compressed with alumina or kaolin powders. Various oxides are used as the active cathode materials. Accordingly, the need still exists for an improved secondary battery capable of providing a long cycle life at a high energy density under conditions of rapid and repeated cycling.

SUMMARY OF THE INVENTION

It is thus an object of the present invention to provide a novel and improved lithium-molten salt secondary power-producing cell having a greater cycle life than can be achieved using the known lithium-sulfur molten salt batteries.

In accordance with the present invention, a lithium- or lithium alloy-molten salt secondary cell is provided wherein a selected transition metal chalcogenide as herein defined is utilized as the electrochemically active material of the positive electrode. Preferred positive electrode materials include copper sulfide, iron sulfide, nickel sulfide, and nickel oxide. The term "chalcogenides" refers to the Periodic Table group VI electronegative elements in combined form, namely, the oxides, sulfides, selenides, and tellurides. Of these, because of ease of preparation, greater availability, lower molecular weight, and other specific properties, the sulfides and oxides are generally preferred. The transition elements are generally considered to be those elements whose two outer principal quantum shells are incomplete. Exact classification of transition elements may vary slightly with different authors. See, for example, Day, Jr and Selbin, Theoretical Inorganic Chemistry, Reinhold Publ. Corp., New York, 1962, pp. 92–95, and Barnett and Wilson, Inorganic Chemistry, Longmans Green and Co., New York, 1953, pp. 6–7. The term "selected transition metal chalcogenides" as herein defined refers to the chalcogenides of those transition elements of the first series of the Periodic Table beginning with vanadium (atomic number 23) and concluding with zinc (atomic number 30), and further including molybdenum (atomic number 42) from the second series of transition elements. While scandium and titanium are ordinarily classified as transition elements based on their atomic structure, they show a general lack of resemblance in their chemical behavior to the other transition elements. Thus scandium and titanium chalcogenides are considered essentially minimal in effectiveness for the purposes of the present invention. Because of the close similarity in behavior between chromium and molybdenum, the chalcogenides of the latter element are considered usable for the present invention. Thus the chalcogenides of the first series of transition metals beginning with vanadium and concluding with zinc, with the further addition of molybdenum, are defined herein as those chalcogenides of specific interest and utility in the practice of the present invention. The preferred transition metal chalcogenides in the practice of the present invention are the chalcogenides of copper, iron, and nickel. Particularly preferred positive electrode materials include copper sulfide, iron sulfide, nickel sulfide, and nickel oxide. It will, of course, be realized that mixtures or alloys of the desired transition metals or mixtures of their chalcogenides could also be used for preparation of the desired transition metal chalcogenides. For example, a nickel-chromium alloy or a mixture of copper and iron could be converted to the corresponding sulfides, or such metal sulfides prepared by other means could then be mixed and utilized as the positive electrode material. Also, as is well recognized, the terms "oxide" and "sulfide" are frequently used in a generic sense. For example, five crystallographically defined compounds of nickel sulfide exist. Also, double salts such as those of molybdenum and chromium are also suitable in the form of their alkali metal compounds, e.g., $K_2Cr_2O_7$, $Li_2MoO_4$, $Na_2MoO_4$, $Li_2CrO_4$, $K_2MoS_4$. While not all forms of oxides and sulfides of the same transition metal element will behave in the same manner and be equally preferred, the most suitable form may be readily selected, particularly with reference to obtainable cycle life and theoretical energy density of the lithium-molten salt cell in which this compound is used as the positive electrode.

Heretofore when the chalcogens such as sulfur, selenium, and tellurium, particularly sulfur, were utilized as the positive electrode materials in a lithium-molten salt cell, loss of the molten chalcogen from the positive electrode compartment became substantial with repeated cycling. The transition metal chalcogenides are non-volatile solids at the temperature of operation of the lithium-molten salt cell and are relatively insoluble in the molten salt electrolyte. The addition of a lithium chalcogenide to the molten lithium-containing electrolyte further reduces the solubility of the corresponding positive electrode chalcogenide in the molten salt. Hence when these compounds are utilized as the positive electrode material, there is essentially negligible loss of the positive electrode material over a great number of cycles. It has been found that cells using transition metal chalcogenides have lower voltages (about 1.7 volts for $Cu_2S$) versus lithium than do comparable cells using molten chalcogens (about 2.25 volts for sulfur) per se as the positive electrode materials. However, this reduction of the electromotive potential of the cell using the metal chalcogenide compared with the molten chalcogen is more than offset by the substantial improvement obtained in cycle life.

Because of the need for a rechargeable power-producing secondary cell having a high current density and a low internal resistance, the chalcogenides, which are solid at the temperature of operation of the molten salt cell, must be made readily available in a finely divided form presenting a high specific surface. In one method of preparing such a positive electrode, the chalcogenide (other than the oxide) in finely powdered form is mixed with finely divided powdered graphite, and the powdered mixture is enclosed within a graphite container having a porous ceramic or carbon face so that the molten salt may make ready contact with the chalcogenide. Since the oxide will react with carbon, the positive electrode containing the metal oxide is generally prepared by using the oxide powder alone, or the oxide in admixture with the transition metal per se in powdered form. In certain applications it is found to be convenient to mix the fusible electrolyte in finely powdered form with the graphite and the metal chalcogenide. Upon the cell attaining operating temperature, the electrolyte is then in the molten state and makes ready contact with the positive electrode material. In another method, a lattice of porous graphite is used, and the lattice is impregnated using a slurry of the chalcogenide in a liquid such as alcohol. The porous graphite is then baked to evaporate the liquid leaving the chalcogenide in the form of fine particles distributed throughout the intersticies of the porous graphite matrix. Other methods of preparing the positive electrode are also utilizable. Such methods include precipitation from solution, in situ formation by reaction between the metal powder and the elemental chalcogen, and electrochemical preparation.

Any of the lithium-ion-containing molten salt electrolytes ordinarily utilizable with lithium-sulfur cells may be utilized in the practice of the present invention. Exemplary are the binary and ternary alkali-metal eutectic compositions LiI-KI, LiI-LiCl-KI, and LiI-LiCl-LiF. Where the negative electrode is an Li-Al alloy, a molten ternary salt such as LiI-LiCl-KI is generally preferred. Preferably, a lithium chalcogenide corresponding to the chalcogenide of the positive electrode is added to the molten salt. Thus where the positive electrode material is a sulfide or oxide, $Li_2S$ or $Li_2O$ is added, respectively, to the molten salt. It has been found that if a saturating amount of the lithium sulfide (about 0.1 wt. percent) or lithium oxide (about 0.4 wt. percent) is added to the fusible salt electrolyte, long-term cell performance is enhanced. Also, the cell may be operated at a lower temperature by adding a halide salt of an alkali metal or of an alkaline earth metal to lower the melting point of the fused salt electrolyte. Thus the addition of 12 mole percent $BaCl_2$ to the KCl-LiCl eutectic salt lowered the melting point from 352°C to about 320° C. The basic chemistry of the reactions occurring in alkali metal halide molten salt systems has been investigated extensively, but is still only imperfectly understood because of its complexity. See, for example, "Behavior of Metal Oxides and Sulfides in Molten LiCl-KCl Eutectic. Chemical Reactions Forming $O^=$ and $S^=$ Ions." Delarne, Chim. Anal. (Paris) 44, 91–101 (1962). C.A. 57 7982b (1962). C.A. 57, 7982b (1962).

BRIEF DESCRIPTION OF THE DRAWINGS

The sole FIGURE of the drawing is a cross-sectional elevational view of a secondary lithium-molten salt battery utilizing a positive electrode in accordance with the present invention.

DESCRIPTION OF THE PREFERRED EMBODIMENTS

In its broadest aspects, the electrically regenerable molten salt electrochemical system of this invention utilizes as its rechargeable positive electrode material a chalcogenide of a selected first series transition metal, namely, V, Cr, Mn, Fe, Co, Ni, Cu, and Zn, plus Mo of the second transition series. However, because the obtaining of a cell having maximum energy density compatible with long cycle life is a desideratum of the present invention, those compounds having a relatively high theoretical energy density (greater than 200 watt-hr/lb) are particularly preferred as positive electrode materials, namely, the sulfides of chromium, manganese, iron, colbalt, nickel, copper, and molybdenum. Particularly preferred are the sulfides of copper, iron, and nickel, as well as the oxide of nickel, because of the high percentage of theoretical energy density obtained therefrom on repeated cycling.

The theoretical energy density of lithium-metal chalcogenide cells may be readily calculated from known and assumed data available in the literature. Thus the free energies of formation of the metal sulfides may be used to calculate the open-circuit voltage data for cells of the following type: Li/LiCl-KCl/MeS, where Me refers to a bivalent transition metal. The following cell reaction is then assumed:

$$MeS(s)+2Li(l) = Me(s)+Li_2S(s).$$

Using open-circuit voltage data and assuming full utilization of sulfur, the theoretical energy densities of lithium-metal sulfide cells at 380°C are calculated, as shown in Table 1. Similar cell reactions were utilized for Me being a univalent ($Cu_2S$) or tetravalent ($MoS_2$) transition metal.

TABLE 1

| Cell | Theoretical Energy Density of Lithium-Metal Sulfide Cells at 380°C Theoretical Energy Density (watt-hr/lb) |
|---|---|
| Li/MoS$_2$ | 503 |
| Li/MnS | 278 |
| Li/FeS($\alpha, \beta$) | 423 |
| Li/FeS$_2$ | 677 |
| Li/CoS | 413 |
| Li/NiS | 455 |
| Li/Ni$_3$S$_2$ | 328 |
| Li/CuS | 456 |
| Li/Cu$_2$S | 236 |
| Li/ZnS | 284 |

By way of comparison, lead acid and zinc-nickel oxide cells have theoretical energy densities of 78 and 185 watt-hr/lb, respectively.

For purposes of illustration, because of its commercial importance in providing long cycle life at high energy densities, the invention will be particularly described with respect to a preferred embodiment of a secondary cell consisting of a lithium-molten salt-copper sulfide system, although clearly not limited thereto.

Referring to the FIGURE, a sectional, elevational view is shown of a lithium-molten salt cell 10. The cell comprises a stainless steel vessel 12 containing a negative lithium electrode 14 and a positive electrode 16 immersed in a suitable fused salt electrolyte 18, which is molten at the operating temperature of the cell. Vessel 12 is heated by an electric furnace 20 insulated with a suitable refractory material such as alumina. Negative electrode 14 consists of either a lithium-aluminum alloy or, as shown, a porous metal substrate structure 22 which has been impregnated with lithium metal at a temperature of about 650°C. The lithium metal, which is molten at cell operating temperature, may also be contained on a fine wire gauze or screen of nickel or silver. A metal rod 24 is suitably clamped or welded to the lithium matrix structure 22 and serves as the negative terminal lead. The positive electrode 16 consists of a dense graphite cup 26 equipped with a graphite current-conducting rod 28 which serves as the positive terminal lead. Cup 26 is filled to the desired depth with the active material 30, which suitably consists of an intimate powdered mixture of a transition metal chalcogenide, e.g., copper sulfide, and current-carrying graphite. A porous separator 32, suitably of porous graphite or alumina, is placed over the active material and held in place with pins 34 of high-purity alumina. The positive electrode structure shown avoids the use of metal components, which may be reactive in the molten salt used and may undesirably contribute to the electrode process. The electrtolyte 18, suitably LiCl-KCl eutectic mixture, is preferably saturated with a lithium chalcogenide, e.g., lithium sulfide, generally corresponding to the same chalcogenide component as used in the positive electrode material, e.g., copper sulfide. While vessel 12 of the cell has been illustrated as an open vessel, in actual use the cells would consist of a plurality of sealed units suitably connected in series-parallel arrangement to provide a battery having the desired volt-ampere characteristics and ampere-hour capacity. The term "cell" as used in the specification is broadly intended also to include a "battery," e.g., an assemblage in series or parallel arrangement of two or more electric cells.

The following examples are illustrative of the practice of this invention with respect to certain preferred embodiments relating to the use of certain transition metal chalcogenides as the positive electrode material, but are not to be construed as limiting with reference to the utilization of other transition metal chalcogenides not otherwise illustrated, or with respect to optimization of cell current and voltage, which are functions of various cell parameters. Optimization of these several parameters may be achieved where required by experimentation in accordance with the teachings of this invention and the known art relating to lithium-molten salt cells.

EXAMPLE 1

A lithium-molten salt cell was prepared using CuS as the active material of the positive electrode. A mixture was prepared consisting of CuS, carbon black, and a binary salt (LiCl-KCl eutectic) at a weight ratio of 30:50:20, respectively. The depth of the cathode cavity was 0.05 inch, and a total of 0.49 gram (0.042 ampere-hour theoretical capacity calculated for $Cu_2S$) of the cathode mixture was hard pressed into a dense graphite holder. Calcium zirconate (28 percent porosity) was used to cover the mixed cathode material as a separator. A magnesia cylinder was used to contain the molten lithium pool serving as the negative electrode. The cell was operated at 400°C. After initial cycling, it was found that saturating the electrolyte with $Li_2S$ (2 grams/liter) prevented the escape of active sulfide material from the cathode and retained the cathode capacity over a long period of time.

The cell was cycled for more than 250 cycles using a charge cut-off of 2 volts and a discharge cut-off at 1 volt. Cycling was discontinued following mechanical failure (cracking) of the calcium zirconate separator.

After the 97th cycle, the cell was left on open circuit overnight for 16 hours; the cell voltage remained steady at 1.68 volts. A discharge current at 50 ma was then applied; the ampere-hour efficiency then decreased from 100 to 82.5 percent, indicating some self discharge.

EXAMPLE 2

A lithium-molten salt cell having 0.38 amp-hr storage capacity was prepared using copper sulfide as the active material of the positive electrode. The pores of a porous graphite disk (90 percent porosity) were filled with fine (−400 mesh) CuS powder. This disk was then encased in a dense graphite electrode holder. The graphite electrode structure was sealed with a porous alumina separator, and the electrode was immersed in a LiCl-KCl eutectic salt saturated with $Li_2S$ (0.2 wt.%) as electrolyte. Molten lithium absorbed on a porous metal substrate was used as the negative electrode.

More than 400 charge-discharge cycles were run at 50 ma/cm². Discharge was at a lower voltage cut-off of 1.0 volt, with charge being at an upper voltage cut-off of 2.0 volts. The open-circuit voltage of the cell was 1.68 volts. The discharge time was 95 minutes compared with a charge time of 100 minutes, showing 95% coulombic efficiency. The average discharge voltage was 1.35 volts, with an average charging voltage of 1.90 volts.

While CuS was initially utilized, it was found that after the first discharge cycle the CuS was converted to $Cu_2S$ and then to metallic copper. On charge, it was noted that the Cu was converted to $Cu_2S$, and this indicated the end of the charge cycle. Therefore $Cu_2S$ appeared to be the active electrode material of the rechargeable copper sulfide-containing positive electrode.

EXAMPLE 3

A lithium-molten salt cell utilizing $K_2MoS_4$ as positive electrode active material was prepared. A mixture of the molten salt (KCl-LiCl eutectic) with the molybdate and carbon black was prepared. The weight ratio of $K_2MoS_4$: carbon black: binary salt was 50:30:20. Both the $K_2MoS_4$ and the carbon black were prior vacuum heated overnight to remove any moisture present. Two grams of the mixture was then pressed into a disk cavity similar to that used in Example 1. The lithium electrode was prepared in a similar manner to that of Example 1. An alumina separator impregnated with electrolyte was used to cover the mixed cathode as diffusion barrier. The cell was operated at 370°–380°C.

The cell was run for a total of 301 cycles. The cell operation reached steady-state conditions after 200 cycles with a coulombic efficiency of 55 percent, and 25 percent of theoretical capacity being utilized calculated on $MoS_3$ as the active component. X-ray diffraction analysis of the discharged mixed cathode compartment at the end of the run showed that the major components were LiCl, KCl, and $MoS_2$. The run was made without saturation of the electrolyte with $Li_2S$, which ordinarily would be expected to enhance the retention of sulfur in the cell thereby giving a greater coulombic efficiency.

EXAMPLE 4

A cell was prepared with $FeS_2$ as the active positive electrode material. A mixture of iron pyrite ($FeS_2$), carbon black, and a binary salt (KCl-LiCl eutectic) which contained 0.2 percent $Li_2S$ was prepared at a weight ratio of 58:25:17. Both the iron pyrite powder and the carbon black were vacuum heated at elevated temperatures overnight prior to forming the cathode mixture. A total of 2.6 grams (1.34 ampere-hours theoretical) was hard pressed into a dense graphite holder. A calcium zirconate separator (44 percent porosity) impregnated with electrolyte was then used to cover the mixed cathode as a diffusion barrier. Such separators are good electrical insulators and possess high ionic conductivities when impregnated with KCl-LiCl fused salts. The lithium electrode was similar to that utilized in Example 1. The temperature of operation was maintained at about 400 °C.

Cell operation was initially at 100% coulombic efficiency, which later decreased to about 70%. The run was continued for 32 cycles, when interrupted by mechanical breaking of the calcium zirconate barrier separator.

The cell showed an open circuit of voltage of 1.65 volts, the maximum cell capacity (based on conversion of S atoms of $FeS_2$ to $Li_2S$) was 45 percent of theoretical. The corresponding coulombic efficiency (determined in the same cycle) was 75 percent. Electrode polarization measurements indicated that a current density of 100 $ma/cm^2$ could be delivered by the cell at 1.15 volts.

EXAMPLE 5

The cathode mixture utilized comprised iron pyrite, carbon black, and electrolyte (binary LiCl-KCl eutectic) at a weight ratio of 30:50:20. Compared with Example 4, the $FeS_2$ concentration was lowered from 58 to 30 wt. percent, and the depth of the cathode compartment was decreased from 0.20 inch to 0.05 inch in order to insure maximum utilization of the iron pyrite active material. The binary electrolyte was saturated with $Li_2S$ and operated at 380°C. An alumina separator was used.

The cell was operated for a total of 165 cycles, the final plateau of the coulombic efficiency being at about 70 percent. When held on open circuit, two voltage plateaus were observed at 1.65 and 1.05 volts, indicating some self discharge. The cell was completely discharged after 8 hours.

The experimentally determined energy storage capacity of the $FeS_2$ was 0.45 amp-hr/gm (50 percent of theoretical). On the basis of this capacity and the open circuit voltage of 1.65 volts, the theoretical energy density of the cell was calculated as 460 watt-hr./lb.

EXAMPLE 6

A lithium-molten salt cell was prepared utilizing NiS as the active positive electrode material. The mixed cathode comprised nickel powder, lithium sulfide, carbon black, and binary salt (LiCl-KCl eutectic) at a weight ratio of 15:15:45:25. The nickel sulfide compound was electrochemically synthesized in the electrode compartment from a mixture of the nickel and lithium sulfide. A total of 0.54 gram of the mixture was hard pressed into a dense graphite holder. A calcium zirconate separator (37 percent porosity) impregnated with the salt was used to cover the mixed cathode as a diffusion barrier. The theoretical capacity of cathode active material based on the discharge of NiS to $Li_2S$ was 0.094 amp-hr. A magnesia cylinder was used to contain the molten lithium, in a manner similar to that of Example 1. The KCl-LiCl electrolyte was saturated with $Li_2S$ and operated at 380°–390°C.

The cell was operated for 114 cycles. Three distinct plateaus were observed during the charge and discharge at a rate of 50 ma, which were assumed to correspond to different stoichiometric compounds of nickel sulfide ($Ni_3S_2$, NiS, or $Ni_3S_4$).

The Li-molten salt-NiS cell demonstrated that 96 percent of coulombic efficiency and a high theoretical capacity of 78 percent (at 10 $ma/cm^2$) were obtainable. However, this cell showed a higher self-discharge rate than a cell using a copper sulfide positive electrode.

EXAMPLE 7

A cell was prepared with $Cr_2S_3$ as the active positive electrode material. A mixture of chromium sulfide ($Cr_2S_3$), carbon black, and a binary salt electrolyte (KCl-LiCl eutectic mixture) which contained 0.2 wt.% $Li_2S$ was prepared at a weight ratio of 30:50:20, respectively. An amount of 0.37 gm of this mixture containing 0.11 gm $Cr_2S_3$ (0.089 amp-hr theoretical) was pressed into a dense graphite holder. A porous magnesia disk was used as a diffusion barrier. The negative lithium electrode was a porous metal substrate impregnated with molten lithium. The cell operating temperature was 380°C.

The open circuit voltage of the reversible cell reaction was 1.30 volts. The average voltage was 1.20 volts on discharge and 1.42 volts on charge when the cell was cycled at 10 $ma/cm^2$ current density. During the first cycle the cell capacity on discharge was 0.086 amp-hr, close to the theoretical value. The capacity decreased during the next three cycles to approximately 0.06 amp-hr.

EXAMPLE 8

A cell was prepared with CuSe as the active positive electrode material. A mixture of copper selenide (CuSe) and carbon black was prepared in a ratio of 95:5. An amount of 0.42 gm of this mixture containing 0.395 gm CuSe (0.078 amp-hr theoretical capacity based on $Cu_2Se$) was pressed into a dense graphite holder. A porous graphite disk was used as a diffusion barrier. The lithium electrode was a porous metal substrate impregnated with molten lithium. The binary eutectic mixture of LiCl and KCl containing 0.15% $Li_2Se$ was used as the electrolyte. The cell was operated at 390°C.

The open circuit cell voltage was 1.60 volts. Cycling was performed at 20 $ma/cm^2$ current density, at an average discharge voltage of 1.50 volts and an average charging voltage of 1.68 volts. An energy capacity of 0.044 amp-hr was obtained during the first discharge and an energy capacity of 0.055 amp-hr during the second discharge cycle, corresponding to 56 and 70 percent utilization of the active electrode material, respectively.

EXAMPLE 9

A lithium-molten salt cell was prepared using nickel oxide as the positive electrode material. A commercially available nickel oxide electrode for use in an alkaline battery was baked at about 500°C for one-half hour to convert the nickel hydroxide present to nickel oxide. This was then placed in a molten (400°–420°C) bath of LiCl-KCl eutectic salt mixture containing 0.4 wt. percent $Li_2O$. The negative electrode was of lithium impregnated on a metal substrate. A cell voltage of 1.68 volts was obtained. The cell was cycled repeatedly and exhibited good charge-discharge characteristics, indicating that the electrode was readily reversible. Some loss of capacity with continued cycling was observed, apparently due to physical sloughing off of the active nickel oxide material from the electrode, which was not encased in any porous supporting structure. The cell was charged and allowed to stand overnight in the molten bath. Subsequent discharge gave nearly a 100 percent coulombic recovery indicating little, if any, self discharge.

It will of course be realized that various modifications can be made in the design and operation of the cell of the present invention without departing from the spirit thereof. Thus while the examples illustrating this invention have been described with respect to specific concentrations, temperatures, and other reaction conditions, the invention may be otherwise practiced, as will be readily apparent to those skilled in this art. Accordingly, this invention is not to be limited by the illustrative and specific embodiments thereof, but its scope should be determined in accordance with the claims thereof.

We claim:

1. A high-temperature power-producing secondary cell including a negative electrode whose active material is lithium, a fused salt electrolyte selected from the class consisting essentially of alkali metal halides, alkaline earth metal halides, and mixtures thereof and which contains lithium ions, and a positive electrode whose active material is a selected transition metal chalcogenide.

2. A cell according to claim 1 wherein said electrolyte additionally contains chalcogenide ions corresponding to those of the active material of the positive electrode.

3. A cell according to claim 1 wherein the transition metal is selected from iron, nickel, and copper.

4. A cell according to claim 3 wherein the active material of the positive electrode is copper sulfide.

5. A cell according to claim 3 wherein the active material of the positive electrode is iron sulfide.

6. A cell according to claim 3 wherein the active material of the positive electrode is nickel sulfide.

7. A cell according to claim 3 wherein the active material of the positive electrode is nickel oxide.

8. A cell according to claim 3 wherein the active material of the positive electrode is copper sulfide and wherein the fused salt electrolyte is the binary eutectic LiCl-KCl saturated with lithium sulfide.

9. A cell according to claim 1 wherein the active material of the positive electrode is other than an oxide and is in intimate admixture with conductive carbon.

* * * * *